3,701,830
METHOD FOR IMPROVING ORAL HEALTH AND HYGIENE IN DOGS AND CATS
Bernard W. Weinrich, St. Charles, and David C. Boyce, Webster Groves, Mo., assignors to Monsanto Company, St. Louis, Mo.
No Drawing. Continuation-in-part of application Ser. No. 9,999, Feb. 9, 1970, which is a continuation-in-part of application Ser. No. 846,930, Aug. 1, 1969, both now abandoned. This application Feb. 26, 1971, Ser. No. 119,421
Int. Cl. A61k 19/00
U.S. Cl. 424—94                                                     4 Claims

ABSTRACT OF THE DISCLOSURE

Pet food compositions useful in promoting oral health and hygiene in dogs and cats consisting essentially of a solid, nutrient feed having incorporated therein neutral protease enzyme. The neutral protease is obtained by fermentation with a neutral protease producing microorganism preferably a strain of Bacillus subtilis or Bacillus stearothermophilus. The amount of neutral protease in the food composition typically is in the range of from about 4,000 to about 4,000,000 active units of enzyme per pound of feed. A method for removing plaque from, and preventing the formation of calculus on the teeth of dogs and cats is provided by feeding to dogs and cats said pet food composition.

CROSS-REFERENCE TO RELATED APPLICATIONS

This application is a continuation-in-part of Ser. No. 9,999, filed Feb. 9, 1970 which application is a continuation-in-part of Ser. No. 846,930, filed Aug. 1, 1969, both now abandoned.

BACKGROUND OF THE INVENTION

Field of the invention

This invention relates to pet food compositions useful in promoting oral health and hygiene in dogs and cats. In a particular aspect this invention relates to a method for removing plaque from and/or preventing the formation of calculus on the teeth of dogs and cats, by feeding to the animal a solid nutrient feed containing an effective amount of neutral protease enzyme. In a still further aspect, this invention relates to a method for removing plaque from and/or preventing the formation of calculus on the teeth of dogs and cats by feeding to the animal a solid nutrient feed containing an effective amount of neutral protease enzyme which enzyme is obtained by fermentation with a strain of Bacillus subtilis or a strain of Bacillus stearothermophilus.

Description of prior art

The increased life span in recent years of household pets, such as dogs and cats, is attributable in part to significant advances in veterinary medicine and in part to the additional care and attention lavished on such pets by their owners in an ever increasingly affluent society. It need not be emphasized that increased life span brings with it complex and numerous health problems. Not the least of these are the problems of dental health and hygiene. In particular the development and build-up of plaque and calculus (tartar) on the teeth of dogs and cats can cause disease in the soft tissues of the oral cavity, especially in the gums, and can contribute to causes of dental caries in the animal. All of this can result in great discomfort, damage to general health and eventual tooth loss even in the young animal. Of course, such problems become more numerous and more acute with aging. Further, plaque and calculus harbor bacteria which can contribute to or are major causes of malodorous breath. This condition is especially objectionable when the animal spends a major portion of its time in the dwelling of the owner.

To prevent the formation of plaque and the build-up of calculus on the teeth of dogs and cats, it has been suggested that the teeth of the animal be manually cleaned with a brush on a daily basis. In fact, special brushes have been devised for this purpose. A recent study has shown that in a colony of 126 dogs twenty-six months in age, 95% of the members of the colony had heavy calculus deposits and all of the members had subgingival inflammation. The study showed that the calculus deposits were removed by cleaning, but returned in the same intensity after 5–6 weeks unless regular brushing was maintained. Accordingly, the merits of regular brushing of the teeth of dogs and cats for the aforestated purpose cannot be disputed. However, as a practical matter, none but the most attentive of pet owners would consider a brushing program for a dog or cat on a regular basis and most would find the task time consuming and distasteful.

SUMMARY OF THE INVENTION

It is an object of the present invention to provide pet food compositions which are useful and practical in improving the oral health and hygiene of dogs and cats.

It is a further object of the present invention to provide a simple and easily carried out method for improving oral health and hygiene in dogs and cats.

Other objects and advantages of the present invention will be apparent from the specification and appended claims.

The present invention resides in the discovery that the removal and prevention of plaque and calculus on the teeth of dogs and cats is accomplished by feeding the animal a food consisting essentially of a solid nutrient feed and an effective amount of neutral protease enzyme.

DETAILED DESCRIPTION

In accordance with the present invention, the pet (dog or cat) is fed a solid nutrient pet food having incorporated therein an effective amount of neutral protease enzyme the amount being sufficient to remove plaque from and/or prevent the formation of calculus on the teeth of the pet. While the amount of neutral protease substance in the feed may vary depending, among other things, upon the age and size of the animal, the particular nutrient feed and the eating habits of the animal, generally, an effective amount of neutral protease is not less than about 4,000 units of enzyme activity per pound of feed with amounts in the range of from about 4,000 to about 4,000,000 units being preferred and 100,000 to 3,000,000 units per pound of feed being most preferred. The neutral protease may be in either water-soluble or water-insoluble form.

Analytical methods for determining units of enzyme activity are well known to the art. Protease activity (either neutral or alkaline) is generally determined by well-known protein digestion methods using protein substrates such as casein. Typical procedures for determining protease activity are described in the Journal of General Physiology, 30, (1947) 291 and in Methods of Enzymology, 2 New York Academic Press, 1955, 33.

Neutral protease as used in this application refers to protease enzyme which has its optimum activity at a pH of in the range of from about 6 to about 8. Alkaline protease as used in this application refers to a protease enzyme which has its optimum activity at a pH of in the range of from about 8 to about 11. Protease activity is expressed in casein units with neutral protease activity being determined at a pH of about 7.

Neutral protease enzyme useful in the method of the present invention may be obtained by any suitable procedure such as, for example, by fermentation in a nutrient fermentation medium with a suitable microorganism. Preferred microorganisms are neutral protease producing strains of Bacillus subtilis and Bacillus stearothermophilus. For the purpose of this application Bacillus stearothermophilus is taken to include strains of microorganisms sometimes referred to as Bacillus thermoproteolyticus. Neutral protease producing strains of Bacillus subtilis and Bacillus stearothermophilus are known and are publicly available. A particular strain of Bacillus subtillis is described in U.S. Pat. 3,031,380. A culture of this organism identified as Bacillus subtilis strain NRRL–B–3411 is deposited in the culture collection of the United States Department of Agriculture, Agricultural Service, Northern Utilization Division, Peoria, Ill. A particular neutral protease producing strain of Bacillus stearothermophilus is also deposited in the culture collection of Northern Utilization Research and Development Division, Agricultural Research Service, United States Department of Agriculture in Peoria, Ill., and is identified as Bacillus stearothermophilus NRRL–B–3880. Neutral protease produced by this and other strains of Bacillus stearothermophilus is particularly advantageous when enzyme stability at high temperature is desired.

The preparation of neutral protease by fermentation with neutral-protease producing microorganisms such as strains of Bacillus subtilis and Bacillus stearothremophilus is well-known and is carried out by fermenting under fermentation conditions a culture of the microorganism in an aqueous nutrient fermentation medium containing assimilable sources of nitrogen and carbon. Nutrient minerals such as magnesium sulfate, calcium chloride and dipotassium phosphate are preferably included in the medium. Fermentation conditions may be of the surface or of the submerged type over a relatively broad pH range, preferably from about 5.5 to about 8.0. The temperature of fermentation also may vary over a wide range depending principally on the particular microorganisms. With strains of Bacillus subtilis a temperature in the range of from about 25 to about 45° C. is generally preferred. With strains of Bacillus stearothermophilus a temperature in the range of from about 35 to about 70° C. is generally preferred.

Sources of carbon which are suitable for use in the fermentation medium include carbohydrate sources such as ground yellow dent corn, white corn, potatoes, starch, sucrose, corn syrup, ground oats, barley, wheat, hydrol, etc. The nitrogen source can be in the organic or inorganic form and may be, for example, corn, oats, barley, wheat, ammonia, urea, suitable ammonium salts, such as ammonium chloride and ammonium sulfate, peptone, corn steep liquor, wheat bran extracts, soy bean meal and the like.

On completion of the fermentation the enzyme preparation may be filtered to remove solid material if desired. Also if desired, the enzyme may be recovered from the fermentation medium. Numerous procedures for recovering neutral protease enzyme from aqueous fermentation media are known to the art and include the use of ammonium sulfate to salt out the enzyme, the use of ion exchange resins to sorb unwanted impurities and the use of organic solvents, such as isopropanol and ethanol, to precipitate the enzyme.

Certain strains of neutral protease producing microorganisms produce other enzymes, particularly alkaline protease and amylase, in addition to neutral protease. For example, fermentation with Bacillus subtilis strain NRRL–B–3411 gives an enzyme mixture which has been found to typically contain (recovered solids) in the range of from about 700,000 to about 2,000,000 units of neutral protease activity, in the range of from about 250,000 to about 500,000 units of alkaline protease activity and in the range of about 300,000 to about 500,000 units of amylase activity per gram. This and other enzyme mixtures containing neutral protease may be employed in the present invention or, if desired, the neutral protease can be separated from the mixture of enzymes.

Various procedures for the separation of particular enzymes from mixtures of other enzymes are known to the art. For example, neutral protease may be separated from enzyme mixtures by ion exchange chromatography as described in the Journal of Biological Chemistry 239 (1964–3706) and in Agr. Biol. Chem. 30 (1966) 651. A particular procedure for separating enzyme mixtures of neutral protease, alkaline protease and amylase is disclosed in copending application No. 752,460, filed Aug. 14, 1968, and assigned to the same assignee as this application. The starting material for this technique is a water clear fermentation beer containing the enzyme mixture obtained by filtration or centrifugation or an aqueous extract of the enzyme mixture obtained by redissolving crude solvent precipitated enzyme mixture. Amylase is removed by solvent fractionation in the presence of a calcium salt or by ammonium sulfate fractionation followed by starch adsorption in the presence of aqueous ethanol to remove the last traces of amylase. Pigment is removed by adsorption using a cellulose or other ion exchange resin. The two proteases remaining in solution are fractionated by selective adsorption employing hydroxylapatite as the adsorbent. The neutral protease is adsorbed and subsequently eluted whereas the alkaline protease is unadsorbed.

Any suitable solid, nutrient dog or cat food may be used in the present invention. Such feeds generally contain substantial amounts of protein derived from meat or meat by-products, fish or fish by-products and high protein plant sources such as soy beans and substantial amounts of carbohydrates provided by cereals and grains. Small amounts of vitamin, minerals, flavorings and preservatives are also generally included in such feeds. A typical nutrient feed may be prepared from the following ingredients:

| | Percent |
|---|---|
| Cereal mix | 60 |
| Meat and bone scrap | 30 |
| Fish meal | 3 |
| Fat | 3 |
| Dried milk solids | 2 |
| Vitamins, minerals, etc., q.s. | |

The feed may be in any suitable form, such as, for example, a pellet, meal, combinations of ground meat and cereal, or a pressed or otherwise shaped article such as a bone-shaped hard, chewable biscuit. Ingredients in a typical dog or cat food are not adversely affected by the enzyme or mixture of enzymes employed in the present invention and the enzymes are compatible with the ingredients of nutrient pet foods.

Incorporation of the enzymatic substance in desired quantities in the nutrient pet food can be carried out at any suitable point during the processing and formulation thereof as, for example, during or after the blending of ingredients of the nutrient feed. Distribution of the enzymes throughout the food can be accomplished by conventional means.

The invention will be understood more fully by reference to the following specific examples. It is understood that the examples are presented for the purpose of illustration only and are not intended as a limitation of the invention.

EXAMPLE 1

Preparation of test ration

The test ration was prepared by blending a mixture of neutral protease, alkaline protease and amylase with a solid commercial dog food sold under the name "Purina Dog Chow" by Ralston Purina Company, St. Louis, Mo.

The enzyme was blended with the dog food at a level of 1 gram of enzyme for each pound of dog food. The enzyme mixture was prepared by fermentation with the organism *Bacillus subtilis* strain NRRL-B-3411 and contained approximately 2,000,000 units of neutral protease, approximately 500,000 units of alkaline protease and approximately 500,000 units of amylase per gram of enzyme dry solids.

Test procedure

The teeth of a healthy 21 month old female German Shepherd were examined and observed to have heavy deposits of plaque thereon. For a period of one (1) month prior to the examination, the dog had been fed a diet of water and Purina Dog Chow containing no enzyme. The dog was then feed a diet consisting of water and the test ration for a period of sixteen (16) days. Upon completion of the sixteen (16) day period the teeth of the dog were again examined and it was observed that the deposits of plaque had been substantially reduced. The teeth of the dog appeared whiter and generally cleaner than on the previous examination and the oral cavity in general appeared in healthy condition. Throughout, and on completion of the test, the general health of the dog remained good. No digestive upset or metabolic change was observed.

Similar results are obtained in removing plaque from the teeth of cats when the above enzyme mixture of neutral protease, alkaline protease and amylase is incorporated in like amounts into a solid nutrient cat food and fed to cats.

EXAMPLE 2

Preliminary feeding and preparation

A group of pure bred beagle dogs (ages 17-38 months) were de-wormed and vaccinated against rabies, distemper and hepatitis. The dogs were fed "ad libitum" for a four week period a diet of water and "Purina Dog Chow" solid dog food. On completion of the four week feeding period the group was divided into three subgroups (subgroup I—8 dogs, subgroup II—10 dogs, subgroup III—8 dogs). Each dog was anesthetized with sodium nembutal (IV) and the upper and lower cuspids and upper molars of each dog (total of 6 teeth per dog) were decalculized and polished by a dentist.

Test feeding

The dogs in each subgroup were fed the above referred to diet of water and solid dog food for seven weeks. Incorporated into the solid dog food given subgroup II was an enzyme mixture (1 gram of enzyme per pound of food) obtained by fermentation with a strain of *Bacillus subtilis*, the mixture containing approximately 1,000,000 units of neutral protease, approximately 250,000 units of amylase per gram of enzyme dry solids. Incorporated into alkaline protease and approximately 250,000 units of the solid dog food given subgroup III was a neutral protease enzyme (0.63 gram per pound of food) containing approximately 1,600,000 units of neutral protease per gram of enzyme dry solids. No enzyme was incorporated into the solid food given subgroup I and that subgroup served as a control. The cleaned teeth of each dog in each subgroup were examined for plaque after three weeks, after five weeks and on completion of the seven-week test and were evaluated as follows:

| Rating: | Meaning |
|---|---|
| 0 | No visible plaque. |
| 1 | Trace of plaque. |
| 2 | Less than ½ of tooth contained plaque. |
| 3 | More than ½ of tooth contained plaque. |

The results of this test are presented in the following table. A "clean" tooth was judged to have a rating of less than 2.

TABLE

| | 3 weeks, No. of teeth rated <2 | 5 weeks, No. of teeth rated <2 | 7 weeks, No. of teeth rated <2 |
|---|---|---|---|
| I (48 teeth) | 8 | 7 | 7 |
| II (60 teeth) | 10 | 14 | 19 |
| III (48 teeth) | 3 | 8 | 13 |

These results show the effectiveness of the enzyme containing pet food of the present invention in retarding the formation of plaque on the teeth of the dogs.

This effectiveness of the neutral protease is made even more surprising when the eating style of the dog is observed and considered. Dogs, when eating solid food of the type fed, tend to gulp the ration. The rapid eating permits only short residence time for the food in the mouth and consequently obviously shortens the contact time of the neutral protease with the teeth.

EXAMPLE 3

Ten dogs are fed a daily ration of a solid, nutrient feed having incorporated therein from 500,000 to 2,000,000 units of neutral protease obtained from *Bacillus subtilis* per pound of nutrient feed and plaque is removed from their teeth.

EXAMPLE 4

Ten dogs are fed a daily ration of a solid, nutrient feed having incorporated therein from about 500,000 to about 2,000,000 units of neutral protease and from about 150,000 to about 500,000 units of alkaline protease per pound of nutrient feed and plaque is removed from their teeth.

EXAMPLE 5

Ten dogs are fed a daily ration of a solid, nutrient feed having incorporated therein from about 500,000 to about 2,000,000 units of neutral protease and from about 150,000 to about 500,000 units of amylase per pound of nutrient feed and plaque is removed from their teeth.

EXAMPLE 6

Ten adult dogs (mixed breeds and both sexes) were fed "ad libitum" for a twelve week period a diet of water and "Purina Dog Chow," the solid food containing neutral protease (4,000 to 4,000,000 units per pound of solid food) and plaque and calculus were removed from the teeth of the dogs. The neutral protease employed is sold under the name Thermolysin and is obtained by fermentation with a strain of *Bacillus stearothermophilus* sometimes referred to as "thermoproteolyticus."

Various modifications and equivalents will be apparent to one skilled in the art and may be made in the compounds, compositions and methods of the present invention without departing from the spirit or scope thereof, and it is therefore to be understood that the invention is to be limited only by the scope of the appended claims.

What is claimed is:

1. A method for removing plaque from and preventing the formation of calculus on the teeth of dogs which comprises feeding said animal a dog food, which the dog eats without substantial chewing, said food consisting essentially of a solid nutrient feed and an effective amount of neutral protease enzyme, said neutral protease being obtained by fermentation with a strain of *Bacillus subtilis* in an aqueous nutrient fermentation medium containing assimilable carbon and nitrogen at a temperature in the range of from about 25 to about 45° C.

2. A method for removing plaque from and preventing the formation of calculus on the teeth of cats which comprises feeding said animal a cat food, which the cat eats without substantial chewing, said food consisting essentially of a solid nutrient feed and an effective amount of neutral protease enzyme, said neutral protease being obtained by fermentation with a strain of *Bacillus subtilis* in an aqueous nutrient fermentation medium containing assimilable carbon and nitrogen at a temperature in the range of from about 25 to about 45° C.

3. A method for removing plaque from and preventing the formation of calculus on the teeth of dogs which comprises feeding said animal a dog food, which the dog eats without substantial chewing, said food consisting essentially of a solid, nutrient feed and an effective amount of neutral protease enzyme, said neutral protease being obtained by fermentation with a strain of *Bacillus stearothermophilus* in an aqueous nutrient fermentation medium containing assimilable carbon and nitrogen at a temperature in the range of from about 35 to about 70° C.

4. A method for removing plaque from and preventing the formation of calculus on the teeth of cats which comprises feeding said animal a cat food, which the cat eats without substantial chewing, said food consisting essentially of a solid, nutrient feed and an effective amount of neutral protease enzyme, said neutral protease being obtained by fermentation with a strain of *Bacillus stearothermophilus* in an aqueous nutrient fermentation medium containing assimilable carbon and nitrogen at a temperature in the range of from about 35 to 70° C.

References Cited
UNITED STATES PATENTS 3,590,121   6/1971   Schiff et al. _____ 424—50

OTHER REFERENCES

Harrisson et al., J. Periodontology, vol. 34, pp. 334–337, 1963.

Fitzgerald et al., J.A.D.A., vol. 76, pp. 301–304, 1968.

RICHARD L. HUFF, Primary Examiner